US012784615B2

(12) United States Patent
Vedula et al.

(10) Patent No.: US 12,784,615 B2
(45) Date of Patent: Nov. 3, 2026

(54) SYSTEMS AND METHODS FOR ASSESSING SURGICAL SKILL

(71) Applicant: THE JOHNS HOPKINS UNIVERSITY, Baltimore, MD (US)

(72) Inventors: Satyanarayana S. Vedula, Baltimore, MD (US); Shameema Sikder, Chevy Chase, MD (US); Gregory D. Hager, Baltimore, MD (US); Tae Soo Kim, Baltimore, MD (US); Chien-Ming Huang, Baltimore, MD (US); Anand Malpani, Baltimore, MD (US); Kristen H. Park, Baltimore, MD (US); Bohua Wan, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 387 days.

(21) Appl. No.: 18/281,337

(22) PCT Filed: Mar. 22, 2022

(86) PCT No.: PCT/US2022/021258
§ 371 (c)(1),
(2) Date: Sep. 11, 2023

(87) PCT Pub. No.: WO2022/204083
PCT Pub. Date: Sep. 29, 2022

(65) Prior Publication Data

US 2024/0161652 A1 May 16, 2024

Related U.S. Application Data

(60) Provisional application No. 63/165,862, filed on Mar. 25, 2021.

(51) Int. Cl.
*G09B 23/28* (2006.01)
*G09B 5/02* (2006.01)

(52) U.S. Cl.
CPC ............... *G09B 23/28* (2013.01); *G09B 5/02* (2013.01)

(58) Field of Classification Search
CPC ...... A61B 2034/302; A61B 2034/2065; G09B 19/00; G09B 23/28
See application file for complete search history.

(56) References Cited

U.S. PATENT DOCUMENTS

2016/0098933 A1* 4/2016 Reiley .................... G09B 7/00 434/262
2018/0247560 A1 8/2018 Mackenzie et al.
(Continued)

OTHER PUBLICATIONS

Jin et al "Tool Detection and Operative Skill Assessment in Surgical Videos Using Region-Based Convolutional Neural Networks" (Year: 2018).*
(Continued)

*Primary Examiner* — Robert J Utama
(74) *Attorney, Agent, or Firm* — MH2 Technology Law Group LLP

(57) ABSTRACT

A method includes determining one or more metrics of a surgical task being performed by a surgeon based at least partially upon a type of the surgical task being performed and a video of the surgical task being performed. The method also includes determining a surgical skill of the surgeon during the surgical task based at least partially upon the video, the one or more metrics, or a combination thereof.

18 Claims, 10 Drawing Sheets

(56) References Cited

U.S. PATENT DOCUMENTS

| | | | |
|---|---|---|---|
| 2018/0253994 A1 | 9/2018 | Reiley et al. | |
| 2019/0362834 A1 | 11/2019 | Venkataraman et al. | |
| 2020/0265273 A1 | 8/2020 | Wei et al. | |
| 2020/0273563 A1* | 8/2020 | Wolf .................... | A61B 5/7275 |
| 2020/0367974 A1 | 11/2020 | Khalid et al. | |

OTHER PUBLICATIONS

Zafar et al "Objective assessment of technical skill targeted to time in cataract surgery" (Year: 2020).*
Golahmadi et al. "Tool-tissue forces in surgery: A systematic review" (Year: 2021).*
Sugiyama. "Forces of Tool-Tissue Interaction to Assess Surgical Skill Level" (Year: 2018).*
Kobayashi, M. (Authorized officer), International Preliminary Report on Patentability in corresponding International Application No. PCT/US2022/021258 mailed on Oct. 5, 2023, 15 pages.
Kim, H. (Authorized officer), International Search Report and Written Opinion in corresponding International Application No. PCT/US2022/021258 mailed on Jun. 6, 2022, 16 pages.

* cited by examiner $$\text{DiffDeltaTheta12} = \theta_2 - \theta_1 = 0$$
$$\text{DiffDeltaTheta34} = \theta_4 - \theta_3 = 0$$

SYSTEMS AND METHODS FOR ASSESSING SURGICAL SKILL

CROSS-REFERENCE TO RELATED APPLICATIONS

This patent application is the national stage entry of International Patent Application No. PCT/US2022/021258, filed on Mar. 22, 2022, and published as WO 2022/204083 A1 on Sep. 29, 2022, which claims the benefit of U.S. Provisional Patent Application Ser. No. 63/165,862, filed Mar. 25, 2021, both of which are hereby incorporated by reference herein in their entireties.

GOVERNMENT RIGHTS

This invention was made with Government support under EY033065, awarded by the National Health Institutes. The Government has certain rights in the invention.

FIELD OF THE INVENTION

The present invention relates generally to systems and methods for assessing surgical skill. More particularly, the present invention relates to systems and methods for using videos of the surgical field and context-specific quantitative metrics to automate the assessment of surgical skill in an operating room.

BACKGROUND OF THE INVENTION

Surgery continuously evolves through new techniques, procedures, and technologies. Throughout their careers, surgeons acquire skill by learning new techniques and mastering known techniques. Prior to board certification, their learning is supported by an experienced supervisor during residency and fellowship. However, surgeons perform a small fraction of the total procedures in their career during residency training. Furthermore, learning in the operating room, despite being essential to acquire surgical skill, is limited by ad hoc teaching opportunities that compete with patient care. Once surgeons start practice, they lose routine access to specific feedback that helps them improve how they operate.

In one example, cataract surgery is the definitive intervention for vision loss due to cataract. Cataract surgery may result in distinct patient benefits including a reduced risk of death, falls, and motor vehicle accidents. An estimated 6353 cataract surgery procedures per million individuals are performed in the United States each year. Nearly 2.3 million procedures were performed in 2014 in Medicare beneficiaries alone. About 50 million Americans are expected to require cataract surgery by 2050.

Even with a common surgical procedure, such as cataract surgery, patient outcomes improve with surgeons' experience. Compared with surgeons who perform more than 1000 cataract procedures, the estimated risk of adverse events is 2-, 4-, and 8-fold higher for surgeons who performed 500 to 1000 procedures, 251 to 500 procedures, and fewer than 250 procedures, respectively. High complication rates in patients are 9 times more likely for surgeons in their first year than those in their tenth year of independent practice. Furthermore, each year of independent practice reduces this risk of complication by about 10%. Academic settings are similar, where the risk of complications when residents operate under supervision were higher for novice faculty than experienced faculty. Continuing technical development may improve the quality of surgical care and outcomes, but surgeons lack structured resources during training and accessible resources after entering independent practice.

The status quo of providing surgeons with patient outcomes or subjective skill assessments is insufficient because it is not intuitive for most surgeons to translate them into specifically how they can improve. Current alternatives for continuous feedback for surgeons include subjective crowdsourcing assessments and surgical coaching, which can be either through direct observation in the operating room or through video review. Despite evidence of effectiveness, surgical coaching is limited by barriers, including lack of time and access to qualified coaches, concerns of judgment by peers, and a sense of loss of autonomy. Therefore, it would be beneficial to have improved systems and methods for using context-specific quantitative metrics to automate the assessment of surgical skill in an operating room.

SUMMARY OF THE INVENTION

A method for determining or assessing a surgical skill is disclosed. The method includes determining one or more metrics of a surgical task being performed by a surgeon based at least partially upon a type of the surgical task being performed and a video of the surgical task being performed. The method also includes determining a surgical skill of the surgeon during the surgical task based at least partially upon the video, the one or more metrics, or a combination thereof.

In another embodiment, a method for determining a surgical skill of a surgeon during a surgical task is disclosed. The method includes capturing a video of a surgical task being performed by a surgeon. The method also includes segmenting the surgical task a plurality of segments. The method also includes marking one or more portions in the video. The one or more marked portions include a hand of the surgeon, an instrument that the surgeon is using to perform the surgical task, an anatomy on which the surgical task is being performed, or a combination thereof. The method also includes determining one or more metrics of the surgical task based at least partially upon a type of the surgical task being performed, one or more of the segments, and the one or more marked portions. The one or more metrics describe movement of the instrument, an appearance of the anatomy, a change in the anatomy, an interaction between the instrument and the anatomy, or a combination thereof. The method also includes determining a surgical skill of the surgeon during the surgical task based at least partially upon the one or more metrics. The method may also include providing feedback about the surgical skill.

A system for determining a surgical skill of a surgeon during a surgical task is also disclosed. The system includes a computing system having one or more processors and a memory system. The memory system includes one or more non-transitory computer-readable media storing instructions that, when executed by at least one of the one or more processors, cause the computing system to perform operations. The operations include receiving a video of a surgical task being performed by a surgeon. The operations also include segmenting the surgical task into a plurality of segments. The operations also include marking one or more portions in the video. The one or more marked portions include a hand of the surgeon, an instrument that the surgeon is using to perform the surgical task, an anatomy on which the surgical task is being performed, or a combination thereof. The operations also include determining one or more metrics of the surgical task based at least partially upon a type of the surgical task being performed, one or more of the segments, and the one or more marked portions. The one or more metrics describe movement of the instrument, an appearance of the anatomy, a change in the anatomy, an interaction between the instrument and the anatomy, or a combination thereof. The operations also include determining a surgical skill of the surgeon during the surgical task based at least partially upon the one or more metrics. The operations also include providing feedback about the surgical skill.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
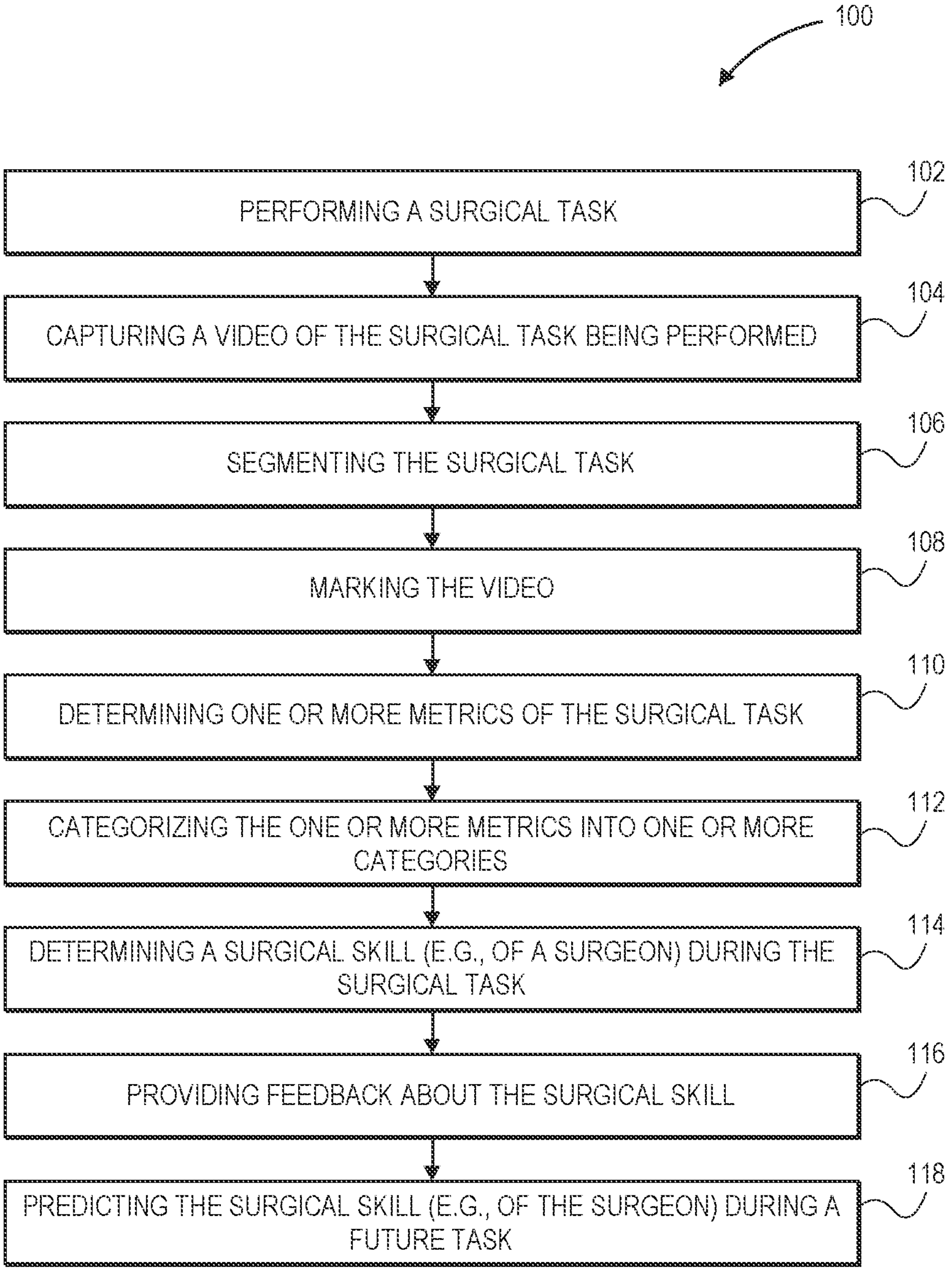
FIG. 1 is a flowchart of a method for determining steps or tasks in a surgical procedure, according to an embodiment.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present disclosure is directed to systems and methods for determining quantitative assessment of surgical skill using videos of the surgical field including metrics that pertain to specific aspects of a given surgical procedure, and using these metrics to assess surgical skill. More particularly, quantitative metrics that specifically describe different aspects of how a surgical task is performed may be determined. The metrics may be identified using textbooks, teachings by surgeons, etc. The metrics may be specific to the surgical context in a given scenario. The metrics may be described or defined in terms of objects in the surgical field (e.g., in a simulation and/or in an operating room). The objects may be or include the instruments used to perform the surgery, the anatomy of the patient, and specific interactions between the instruments and anatomy that are observed during a surgery. The metrics may then be extracted using data from the surgical field. A subset of the extracted metrics may be selected to determine or predict skill. A skill assessment may then be generated based upon the subset. The specificity of the metrics to the task or activity being performed may result in a translation of measurable change in performance that surgeons can target during their learning.

The systems and methods described herein may develop and/or store a library of surgical videos, intuitively displayed on a dashboard on a computing system. This may allow a surgeon to watch the video of the full surgical task or one or more selected steps thereof. The system and method may also generate an unbiased objective assessment of the surgeon's skill for target steps, and review pertinent examples with feedback on how to improve the surgeon's performance. The platform functionalities may be enabled and automated by machine learning (ML) techniques. These functionalities may include extraction of targeted segments of a surgical task, assessment of surgical skills for the extracted segments, identifying appropriate feedback, and relating the assessment and feedback to the surgeon.

FIG. 1 is a flowchart of a method 100 for determining a surgical skill (e.g., of a surgeon) during a surgical task, according to an embodiment. An illustrative order of the method 100 is provided below; however, one or more steps of the method 100 may be performed in a different order, performed simultaneously, repeated, or omitted.

The method 100 may also include performing a surgical task, as at 102. In one example, the surgical task may be or include at least a portion of a capsulorhexis procedure, and the following description of the method 100 is described using this example. However, as will be appreciated, the method 100 may be applied to any surgical task. In another example, the surgical task may be or include at least a portion of a trabeculectomy procedure or a prostatectomy procedure. As used herein, a "surgeon task" refers to at least a portion of a "surgical procedure."

Figure 2:
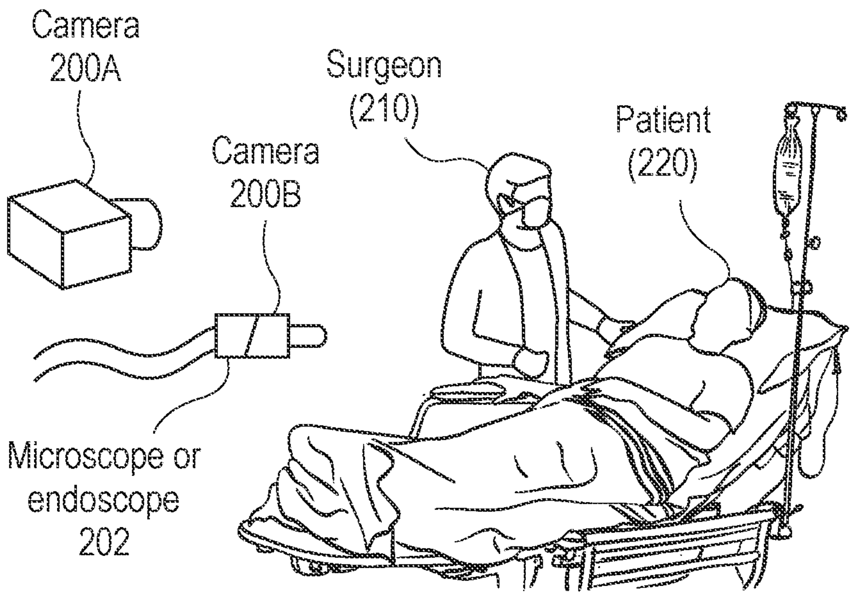
FIG. 2 illustrates a schematic view of a camera capturing a video of a surgeon performing the surgical task on a patient, according to an embodiment.

The method 100 may also include capturing a video of the surgical task being performed, as at 104. This may also or instead include capturing a video of at least a portion of the full surgical procedure including the surgical task. FIG. 2 illustrates a schematic view of one or more cameras (two are shown: 200A, 200B) capturing one or more videos of a surgeon 210 performing the surgical task on a patient 220, according to an embodiment. Each video may include a plurality of images (also referred to as frames). The cameras 200A, 200B may be positioned at different locations to capture videos of the surgical task from different viewpoints/angles (e.g., simultaneously). In the example shown, the camera 200A may be mounted on a stationary object (e.g., a tripod), mounted on the surgeon 210, held by another person in the room (e.g., not the surgeon), or the like. In the example shown, the camera 200B may be coupled to or part of a microscope or endoscope that is configured to be inserted at least partially into the patient 220. Thus, the camera 200B may be configured to capture video of the surgical task internally. Other types of cameras or sensors (e.g., motion sensors), vital sensors, etc. may be used as well.

Figure 3:
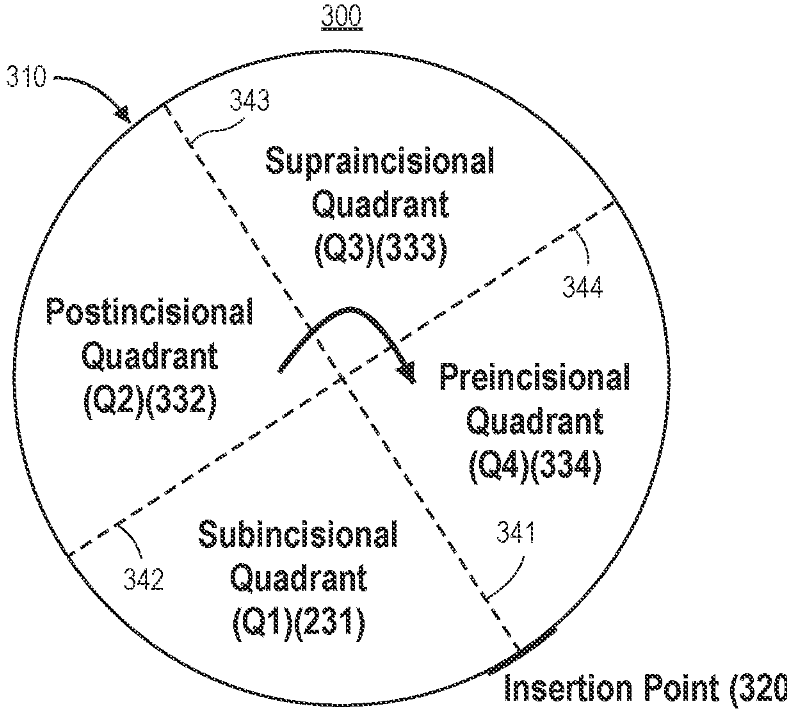
FIG. 3 illustrates a schematic view of a segmented surgical task, according to an embodiment.

The method 100 may include segmenting the surgical task (e.g., into different portions), as at 106. This may also or instead include segmenting the surgical procedure (e.g., into different surgical tasks). FIG. 3 illustrates a schematic view of a segmented surgical task 300, according to an embodiment. The surgical task 300 may be segmented manually (e.g., using crowdsourcing) or automatically (e.g., using an algorithm).

As mentioned above, in this particular example, the surgical task 300 that is segmented is at least a part of a capsulorhexis procedure. A capsulorhexis procedure is used to remove a membrane (e.g., the lens capsule) 310 from the eye during cataract surgery by shear and stretch forces. More particularly, during a capsulorhexis procedure, a surgeon may use one or more instruments (e.g., forceps) to hold the lens capsule 310 and tear it in discrete movements to create a round, smooth, and continuous aperture to access the underlying lens. For example, the instrument may be inserted into/through the lens capsule 310 at an insertion point 320 and used to tear the lens capsule 310 into four segments/portions: a subincisional quadrant 331, a postincisional quadrant 332, a supraincisional quadrant 333, and a preincisional quadrant 334. The subincisional quadrant 331 may be defined by a first tear line 341 and a second tear line 342. The postincisional quadrant 332 may be defined by the second tear line 342 and a third tear line 343. The supraincisional quadrant 333 may be defined by the third tear line 343 and a fourth tear line 344. The preincisional quadrant 334 may be defined by the fourth tear line 344 and the first tear line 341.

The method 100 may also include marking the video, as at 108. This may include marking (also referred to as localizing) the hand of the surgeon 210 that is performing the surgical task. This may also include marking an instrument or other elements visible or hypothesized in the video that is/are used (e.g., by the surgeon 210) to perform the surgical task. The hand, the instrument, or both may be referred to as an effector. This may also or instead include marking the anatomy (e.g., the appearance and/or change of the anatomy) of the patient 220 on which the surgical task is being performed (e.g., the lens capsule 310).

Figure 4:
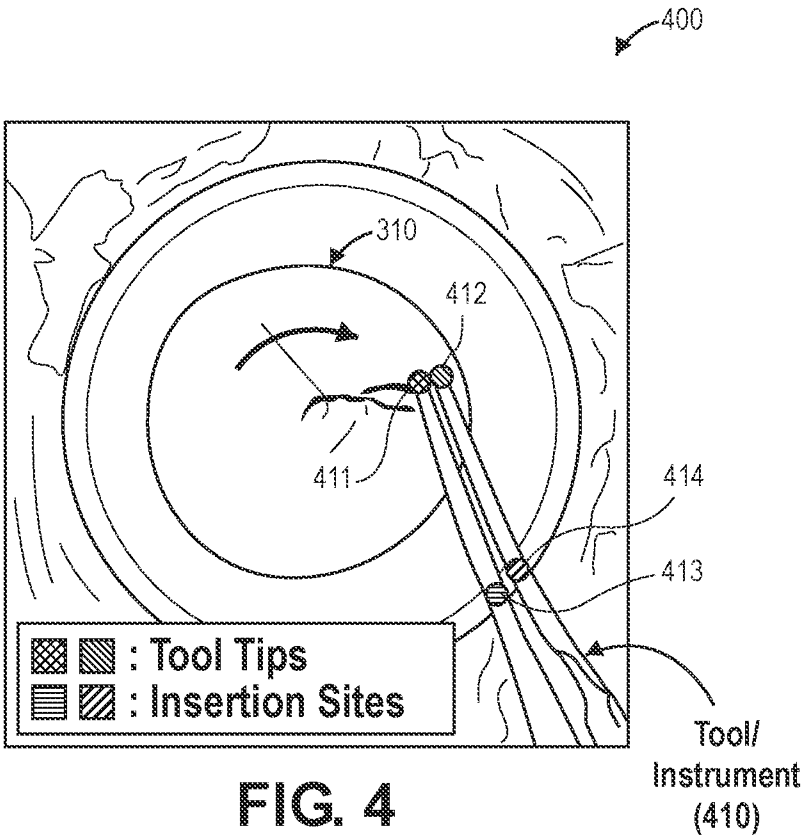
FIG. 4 illustrates a schematic view of a frame of a video showing an instrument (e.g., forceps) performing the surgical task, according to an embodiment.

FIG. 4 illustrates a schematic view of a frame 400 of a video showing an instrument (e.g., forceps) 410 performing the surgical task, according to an embodiment. In one embodiment, marking the instrument 410 used to perform the surgical task may include marking one or more portions (four are shown: 411, 412, 413, 414) of the instrument 410. The first marked portion 411 may be or include a first tip of the instrument 410. The second marked portion 412 may be or include a second tip of the instrument 410. The third marked portion 413 may be or include a first insertion site of the instrument 410. The fourth marked portion 414 may be or include a second insertion site of the instrument 410. The insertion site refers to the location where the instrument 410 is inserted through the tissue or a membrane (e.g., the lens capsule 310).

The portions 411-414 may be marked one or more times in the video. In one example, the portions 411-414 may be marked in each segment of the video. In another example, the portions 411-414 may be marked in each frame 400 of the video. In one example, coordinate points of the marked instrument tips 411, 412 may be standardized so that the middle of the marked insertion sites 413, 414 may be set as the origin in each marked frame. This may help to account for potential movement of the camera. However, other techniques may also or instead be used to account for movement of the camera.

In one embodiment, the portions 411-414 may be marked manually (e.g., using crowdsourcing). In another embodiment, the portions 411-414 may be marked automatically using an algorithm (e.g., a high-resolution net algorithm). For example, the algorithm may be able to predict the locations of the portions 411-414 (e.g., when the locations are not visible in the video). In yet another embodiment, step 108 (i.e., marking the video) may be omitted.

The method 100 may also include determining one or more metrics of the surgical task, as at 110. The metrics may be based at least partially upon unmarked videos (from 104), the segments of the task (from 106), marked videos (from 108), or a combination thereof. The metrics may be measured in one or more frames (e.g., each frame 400) of the video, between two or more (e.g., consecutive) frames of the video, or a combination thereof. The metrics may be or include context-specific metrics for the particular surgical task (e.g., capsulorhexis procedure). In other words, each type of surgical task may have a different set of metrics. For example, the metrics may describe the movement of the anatomy (e.g., the lens capsule 310), the movement of the instrument 410, the interaction between the anatomy and the instrument 410, or a combination thereof.

In one embodiment, the metrics may be measured/determined manually in the video (e.g., using crowdsourcing). For example, a user (e.g., a surgeon) watching the video (or viewing the frames of the video) may measure/determine the metrics in one or more frames of the video based at least partially upon the marked portions 411-414. In another embodiment, the metrics may be measured/determined automatically in the video. For example, one or more artificial neural networks (ANNs) may measure/determine the metrics in one or more frames of the video (e.g., based at least partially upon the marked portions 411-414). In one embodiment, the ANN may be trained to determine the metrics using a library of videos of similar surgical tasks (e.g., capsulorhexis procedures). The metrics may have been previously determined in the videos in the library.

Each type of surgical task may have different metrics. Illustrative metrics for the particular surgical task (e.g., capsulorhexis procedure) described above may include when the instrument 410 is grasping the tissue/membrane (e.g., the lens capsule 310) and when the instrument 410 is tearing the lens capsule 310. The proximity of the tips 411, 412 of the instrument 410 may be used to determine when the instrument 410 is grasping and/or tearing. The distance between the marked tips 411, 412 may be measured/determined in one or more frames (e.g., each frame) of the video. In one embodiment, the tips 411, 412 of the instrument 410 may be defined as touching when the space between them is less than the sum of the mode (e.g., most frequent value) of the distance between the tips 411, 412 and the standard deviation of these values. This may be referred to as the touch distance threshold. The touch distance threshold may be verified manually through visual comparison with the video. The marked tips 411, 412 may be determined to be grasping the tissue/membrane (e.g., lens capsule 310) in response to a predetermined number of consecutive frames (e.g., two consecutive frames) of the video in which the marked tips 411, 412 are determined to be touching. Tears may be treated as a subset of grasps. For example, the instrument 410 may be determined to be tearing the tissue/membrane (e.g., lens capsule 310) in response to (1) the displacement of the instrument 410 during the grasp being greater than the touch distance threshold; and/or (2) the grasp lasting for longer than a predetermined period of time (e.g., 1 second).

Additional metrics may include: the eye that was operated on (e.g., left or right), the location of incision to access the eye, the direction of flap propagation, the area of the convex hull, the circularity of the convex hull, the total number of grasp movements, the total number of tears, the number of tears placed into quadrants, the average and standard deviation of tear distance (e.g., in pixels), the average and standard deviation of tear duration (e.g., in seconds), the average and standard deviation of retear distance (e.g., in pixels), the average and standard deviation of retear duration (e.g., in seconds), the average and/or standard deviation of the length of the tool within the eye (e.g., in pixels), the distance traveled to complete each quadrant (e.g., in pixels), the average and/or standard deviation of the changes in the angle relative to the insertion point for each quadrant (e.g., in degrees), the total change in the angle relative to the insertion point for each quadrant (e.g., in degrees), the difference between DeltaTheta1 and DeltaTheta2 as well as DeltaTheta3 and DeltaTheta4 (e.g., in degrees), the number of tears placed in each quadrant, the average distance of each tear per quadrant (e.g., in pixels), the average duration of each tear per quadrant (e.g., in seconds), the average length of tool within eye/quadrant (e.g., in pixels), or a combination thereof. Table 1 below provides additional details about these metrics.

TABLE 1

| Name | Description | Method |
|---|---|---|
| Eye | Eye that was operated on | 1 if right eye, 0 if left eye |
| FlapPropDir | Direction of flap propagation | 1 if clockwise, 0 if counterclockwise |
| ConvHullArea*** | Area of the convex hull | Computed the area of convex hull (the smallest convex polygon) created by the positions of the forcep tips |
| ConvHullCircularity | Circularity of the convex hull | Estimated the circularity of the convex hull by using the equation (4 * area)/perimeter$^2$ with a value of 1 indicating perfect circularity |
| TotalGraspNum | Total number of grasp movements | Calculated the total number of sets of consecutive frames in which the forcep tips were defined as touching |
| TotalTearNum | Total number of tears | Tears were differentiated from gasps if (1) the displacement in position for each grasp was greater than the touch distance threshold and (2) the grasp lasted for longer than one second |
| SumNumTear | Number of tears placed into quadrants | Used the notated quadrant timepoints to determine how many of the tears were within the designated time interval |
| AvgTearDist**/ StDevTearDist* | Average and standard deviation of tear distance (pixels) | Computed the total distance moved by the midpoint of the forcep tips for each tear and calculated the average and standard deviation |
| AvgTearDur/ StDevTearDur* | Average and standard deviation of tear duration (seconds) | Determined the number of frames encompassed by each tear, divided this value by the frame rate, and calculated the average and standard deviation |
| AvgRetearDist**/ StDevRetearDist**** | Average and standard deviation of retear distance (pixels) | Computed the total distance moved by the midpoint of the forcep tips between each tear and calculated the average and standard deviation |
| AvgRetearDur/ StDevRetearDur | Average and standard deviation of retear duration (seconds) | Determined the number of frames encompassed between each tear, divided this value by the frame rate, and calculated the average and standard deviation |
| AvgToolLength**/ StDevToolLength*** | Average and standard deviation of the length of the tool within the eye (pixels) | Calculated the distance between the midpoints of the annotated tips and insertion point, and calculated the average and standard deviation |
| Dist1 Dist2 Dist3*** Dist4* | Distance traveled to complete each quadrant (pixels) | Computed the total distance traveled by the midpoint of the forcep tips during each quadrant |
| AvgTheta1/ StDevTheta1 AvgTheta2/ StDevTheta2 AvgTheta3/ | Average and standard deviation of the changes in the angle relative to the insertion point for | Calculated the change in the angle of the tool in respect to the insertion point for each annotated frame of each quadrant, and calculated the average and standard deviation |

TABLE 1-continued

| Name | Description | Method |
|---|---|---|
| StDevTheta3 AvgTheta4/ StDevTheta4 | each quadrant (degrees) | |
| DeltaTheta1 DeltaTheta2 DeltaTheta3* DeltaTheta4 | Total change in the angle relative to the insertion point for each quadrant (degrees) | Subtracted the initial angle of the tool in respect to the insertion point from the final angle for each quadrant |
| DiffDeltaTheta12 DiffDeltaTheta34* | Difference between DeltaThetal and 2 as well as DeltaTheta3 and 4 (degrees) | Calculated the differences between DeltaThetal and DeltaTheta2, the respective metrics for the sub- and post-incisional quadrants, and between DeltaTheta3 and DeltaTheta4, the metrics for the supra- and pre-incisional quadrants; both values should hypothetically be zero given the circular movement of the forceps and the restricted nature of this motion |
| NumTear1 NumTear2 NumTear3 NumTear4 | Number of tears placed in each quadrant | Parsed through each of the quadrants and placed the tears within the listed timepoints of the respective quadrants |
| AvgTearDist1 AvgTearDist2 AvgTearDist3** AvgTearDist4* | Average distance of each tear per quadrant (pixels) | Divided the total distance traveled by the midpoints of the tool tips during the tears by the number of tears for each quadrant |
| AvgTearDur1 AvgTearDur2 AvgTearDur3 AvgTearDur4 | Average duration of each tear per quadrant (seconds) | Divided the total duration of the tears (divided the number of frames by the frame rate for each tear) by the number of tears for each quadrant |
| AvgToolLength1*/ StDevToolLength1 AvgToolLength2/ StDevToolLength2 AvgToolLength3**/ StDevToolLength3*** AvgToolLength4/ StDevToolLength4* | Average length of tool within eye/quadrant (pixels) | Calculated the distance between the midpoints of the annotated tips and insertion points, and calculated the average and standard deviation for each quadrant |

Figure 5:
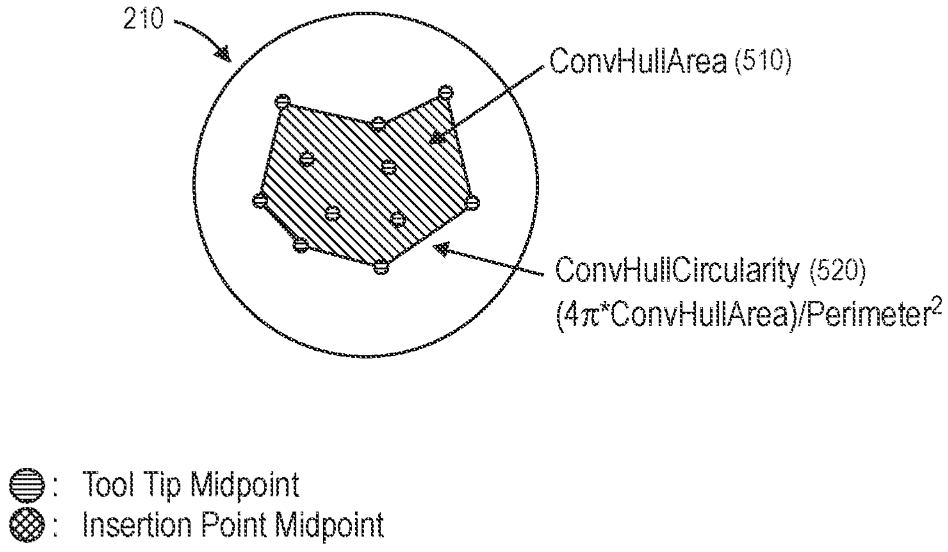
FIG. 5 illustrates a schematic view of a lens capsule showing a convex hull area and a convex hull circularity.
Figure 6:
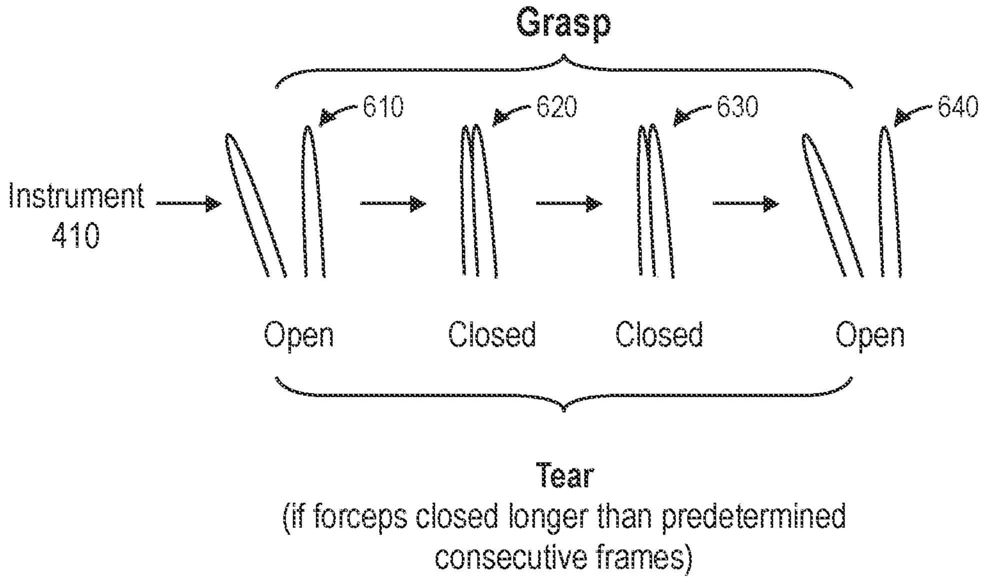
FIG. 6 illustrates a schematic view of the instrument in open and closed positions, according to an embodiment.

FIGS. 5-10 illustrate schematic views showing one or more of the metrics described above. More particularly, FIG. 5 illustrates a schematic view of the lens capsule 310 showing a convex hull area 510 and a convex hull circularity 520. FIG. 6 illustrates a schematic view of the instrument 410 in various positions, according to an embodiment. For example, FIG. 6 shows the instrument 410 in an open position at 610, in a closed position at 620, in the closed position at 630, and in an open position at 640. The closed position may be used to grasp and/or tear the tissue or membrane (e.g., lens capsule 310). In one embodiment, the method 100 may determine that the instrument 410 has created a tear in the lens capsule 310 in response to the instrument 410 being in the closed position for greater than or equal to a predetermined number of frames in the video (e.g., 24 frames).

Figure 7:
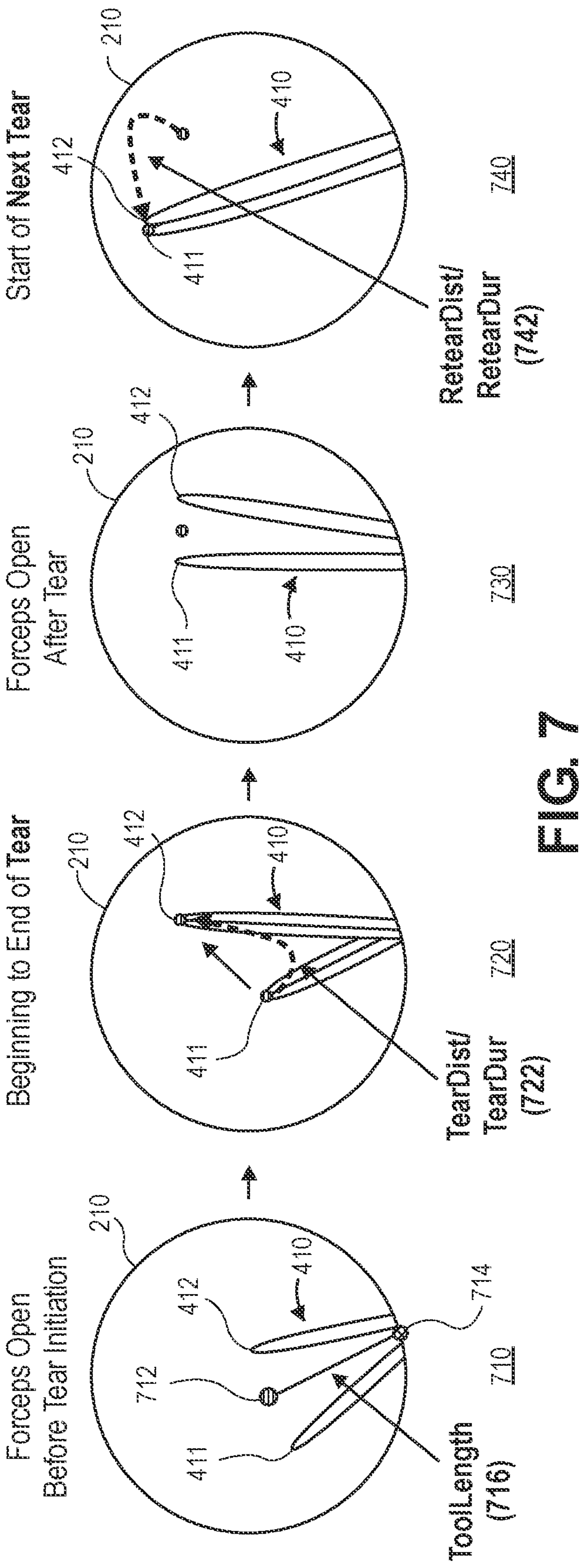
FIG. 7 illustrates a schematic view of the instrument tearing the lens capsule, according to an embodiment.

FIG. 7 illustrates a schematic view of the instrument 410 tearing the lens capsule 310, according to an embodiment. More particularly, at 710, the instrument 410 is in the open position before the tear has been initiated. The point 712 represents the midpoint of the tips 411, 412 of the instrument 410. The point 714 represents the midpoint of the insertion sites 413, 414. The line 716 represents the length of the instrument 410 under and/or inside the lens capsule 310. At 720, the beginning of the tear to the end of the tear is shown. The dashed line 722 represents the distance of the tear, the duration of the tear, or both. At 730, the instrument 410 is in the open position after the tear is complete. At 740, the next tear begins. The dashed line 742 represents the retear distance, the retear duration, or both. As used herein, "retear" refers to the distance moved by the midpoint 714 of the forcep tips 411, 412 between each tear.

Figure 8:
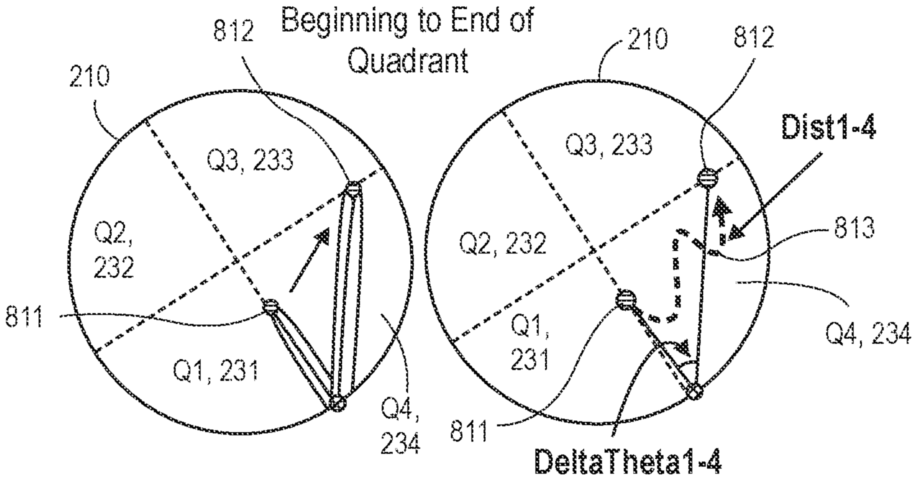
FIG. 8 illustrates a schematic view of instrument movement from the beginning to the end of a quadrant in the surgical task or step, according to an embodiment.

FIG. 8 illustrates a schematic view of the movement of the instrument 410 from the beginning to the end of an incisional quadrant, according to an embodiment. Points 811 and 812 represent the initial and final positions of the instrument 410, respectively, and the dotted path 813 may represent the movement of the instrument 410 through the quadrant. Metrics can be calculated from both the initial and final positions of the quadrant, as well as the path traveled through each.

Figure 9:
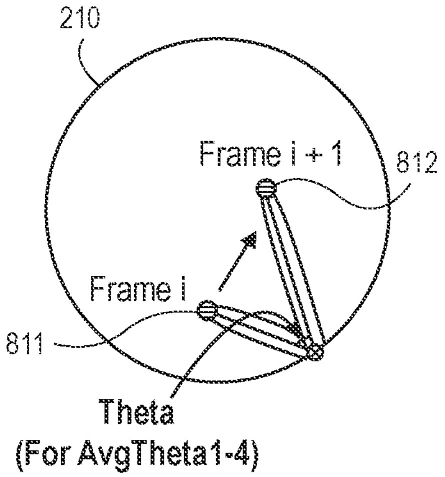
FIG. 9 illustrates a schematic view of frame-by-frame movement, according to an embodiment.
Figure 10:
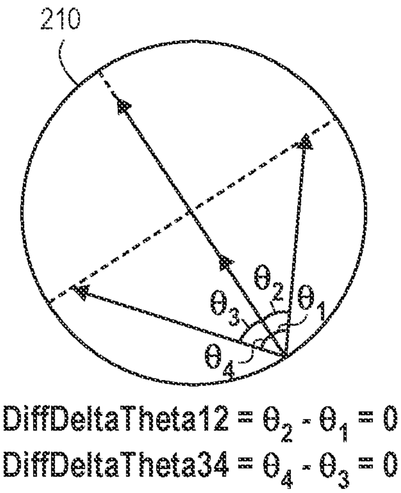
FIG. 10 illustrates a schematic view of instrument positions at the boundary of each quadrant in the surgical task or step, according to an embodiment.

FIG. 9 illustrates a schematic view of frame-by-frame movement, according to an embodiment. Metrics can also be calculated from individual movements between each frame. FIG. 10 illustrates a schematic view of instrument positions at the boundary of each quadrant, according to an embodiment. These locations represent initial and final positions of each quadrant and can be compared to compute additional metrics.

The method 100 may also include categorizing the one or more metrics into one or more categories, as at 112. This may be a sub-step of 110. In one embodiment, the metrics may be categorized manually (e.g., using user/expert input). In another embodiment, the metrics may be categorized automatically. For example, the ANN may categorize the metrics. In one embodiment, the ANN may be trained to categorize the metrics using the library of videos of similar surgical tasks where the metrics have been previously categorized.

Each type of surgical task may have different categories. Illustrative categories for the particular surgical task (e.g., capsulorhexis step) 200 described above may include: metrics that span the entire video and are unrelated to the quadrants, all of the metrics that are related to the quadrants, quadrant-specific metrics divided into each respective quadrant, all of the metrics that characterize grasps and/or tears, including quadrant-specific metrics, quadrant-specific metrics characterizing grasps and/or tears, all metrics relating to the position, distance, and/or angle of the tips 411, 412 of the instrument 410. Table 2 below provides additional details about these categories.

TABLE 2

Categories of metrics illustrated for capsulorhexis step in cataract surgery procedure

| Name | Description | Metrics Included |
|---|---|---|
| General | Metrics that span the entire video and are unrelated to the quadrants (17 metrics) | Eye_Right1_Left0, Dir_Clock1_Counter0, TotalGraspNum, TotalTearNum, SumNumTear, AvgTearDist, StDevTearDist, AvgTearDur, StDevTearDur, AvgRetearDist, StDevRetearDist, AvgRetearDur, StDevRetearDur, ConvHullArea, ConvHullCircularity, AvgToolLength, StDevToolLength |
| Quadrant-Specific | All of the metrics that were related to the quadrants (40 metrics) | Eye_Right1_Left0, Dir_Clock1_Counter0, Dist1-4, AvgTheta1-4, StDevTheta1-4, Delta Theta1-4, DiffDeltaTheta12, DiffDeltaTheta34, NumTear1-4, AvgTearDist1-4, AvgTearDur1-4, AvgToolLength1-4, StDevToolLength1-4 |
| Quadrant 1-4 | Quadrant-specific metrics divided into each respective quadrant (12 metrics each) | Eye_Right1_Left0, Dir_Clock1_Counter0, Dist1, AvgTheta1, StDevTheta1, DeltaTheta1, DiffDelta Theta12, NumTear1, AvgTearDist1, AvgTearDur1, AvgToolLength1, StDevToolLength1 *for the first quadrant |
| Grasp/Tear | All of the metrics that characterize grasps and tears, including quadrant-specific features (25 metrics) | Eye_Right1_Left0, Dir_Clock1_Counter0, TotalGraspNum, TotalTearNum, SumNumTear, AvgTearDist, StDevTearDist, AvgTearDur, StDevTearDur, AvgRetearDist, StDevRetearDist, AvgRetearDur, StDevRetearDur, NumTear1-4, AvgTearDist1-4, AvgTearDur1-4 |
| Grasp/Tear 1-4 | Quadrant-specific features characterizing grasps and tears (5 metrics each) | Eye_Right1_Left0, Dir_Clock1_Counter0, NumTear1, AvgTearDist1, AvgTearDur1 *for the first quadrant |
| Position/Distance | All metrics relating to the position/ distance/angle of the tool tips (40 metrics) | Eye_Right1_Left0, Dir_Clock1_Counter0, AvgTearDist, StDevTearDist, AvgRetearDist, StDevRetearDist, ConvHullArea, ConvHullCircularity, AvgToolLength, StDevToolLength, Dist1-4, AvgTheta1-4, StDevTheta1-4, DeltaTheta1-4, DiffDeltaTheta12, DiffDeltaTheta34, AvgTearDist1-4, AvgToolLength1-4, StDevToolLength1-4 |
| Position/Distance 1-4 | Quadrant-specific features relating to the position/distance/ angle of the tool tips (10 metrics each) | Eye_Right1_Left0, Dir_Clock1_Counter0, Dist1, AvgThetal, StDevThetal, Delta Theta1, DiffDeltaTheta12, AvgTearDist1, AvgToolLength1, StDevToolLength1 *for the first quadrant |
| Time/Duration | All metrics relating to time and duration (10 metrics) | Eye_Right1_Left0, Dir_Clock1_Counter0, AvgTearDur, StDevTearDur AvgRetearDur, StDevRetearDur, AvgTearDur1-4 |

The method 100 may also include determining (also referred to as assessing) a surgical skill (e.g., of a surgeon) during the surgical task, as at 114. The surgical skill may be determined based at least partially (or entirely) upon the unmarked video (from 104), the segments of the task (from 106), the marked portions 411-414 (from 108), the metrics (from 110), the categories (from 112), or a combination thereof. The determined surgical skill may be in the form of a score (e.g., on a scale from 0-100). More particularly, the score may be a continuous scale of surgical skill spanning from poor skill (e.g., novice) to superior skill (e.g., expert). In one embodiment, for capsulorhexis, the score may include two items with each item having a value of either 2 (e.g., novice), 3 (e.g., beginner), 4 (e.g., advanced beginner) or 5 (e.g., expert). In one embodiment, the surgical skill may be assessed in real-time (e.g., during the surgical task).

The surgical skill may be determined automatically. More particularly, the decision tree may determine the surgical skill. For example, the decision tree may be trained to select one or more subsets of the segments, the portions 411-414, the metrics, the categories, or a combination thereof, and the surgical skill may be determined therefrom. The decision tree may be trained using the library of videos of similar surgical tasks where the surgical skill has been previously determined. The ANN may also or instead use attention mechanisms/modules to identify segments and/or metrics in the video that may influence the network's determination. The ANN may also or instead be trained to function as a powerful feature extractor from input data including videos, where the resulting metrics are effectively analyzed to achieve one or more functionalities in the platform.

In one embodiment, the surgical skill may be determined using the ANN (e.g., a temporal convolution network (TCN)) applied to a partially marked video for instrument tips 411, 412. In another embodiment, the surgical skill may be determined using a convolutional neural network (CNN) in combination with or without a spatial attention module to transform the unmarked video (e.g., frames) into a feature that is then run through a recurrent neural network (RNN) with or without temporal attention module(s). As used herein, a "feature" refers to spatial and temporal patterns in video frames that are extracted through convolutions and other operations within the ANN. In yet another embodiment, the surgical skill may be determined using a multi-task learning framework for training neural networks.

Figure 11:
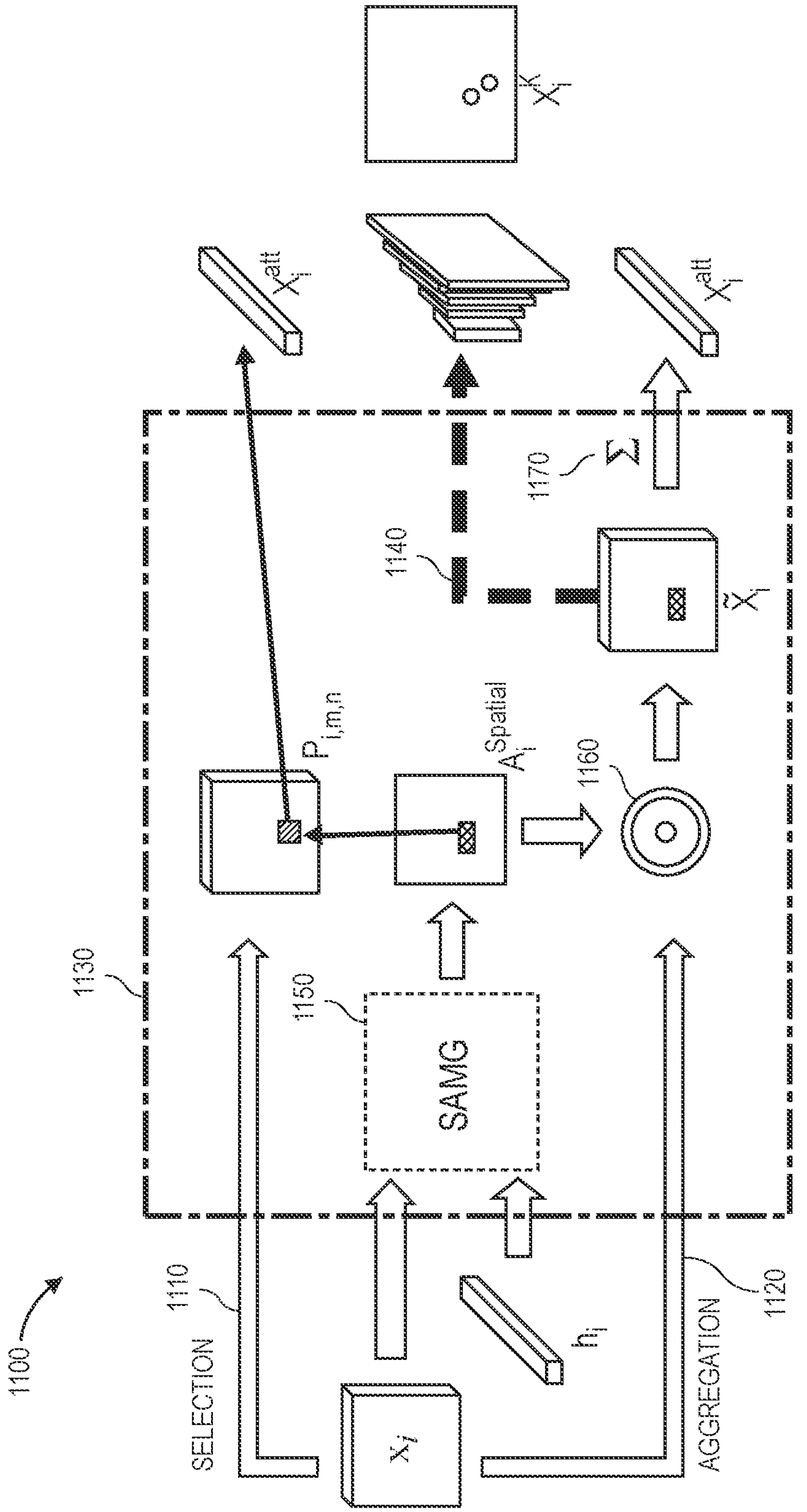
FIG. 11 illustrates a schematic view of a spatial attention module, according to an embodiment.

FIG. 11 illustrates a schematic view of a spatial attention module, according to an embodiment. The upper stream 1110 and lower stream 1120 correspond the selection scheme and aggregation scheme, respectively. In one embodiment, a single scheme (e.g., not both) may be used. In another embodiment, both schemes may be used. The pink dashed box 1130 outlines the spatial attention module. The dashed arrow 1140 shows the pathway for the multi-task learning model used for comparison. The SAMG box 1150 denotes the process to compute the spatial attention map. The circle with a dot inside 1160 is a dot product, and Σ is a summation along the height and width dimensions. The green stacked cubicles 1170 following the dashed arrow 1140 represents multiple layers of transposed convolutional layers.

Conventional attention models, including the baseline model, learn attention maps with task-oriented loss (e.g., cross-entropy loss). As used herein, an "attention map" refers to weights assigned to each pixel in an image. These attention maps, which may be computed within the attention modules mentioned in the previous paragraph, represent a layer of re-weighting or "attending to" the image features. However, without explicit supervision, they may not localize relevant regions in the images. As used herein, "explicit supervision" refers to guiding the network to specific known regions or time windows in the image features. Furthermore, without a large amount of training data, attention mechanisms may assign higher weights to regions having spurious correlations with the target label. To remedy these issues, the system and method herein may explicitly supervise the attention map using specific structured information or cues in the images that are related to the task of surgical skill to improve accuracy of the model predictions. The structured information may include, for example, instrument tip locations, instrument pose, or specific changes in anatomy or other elements in the surgical field. Thus, in one embodiment, determining the surgical skill (e.g., step 114) may include explicit supervision of the attention map using instrument tip trajectories. In an example, binary trajectory heat maps $B_i$ may be constructed for each frame i, combining the locations $s_{k,m,n}$ of all instrument tips, where s is a binary indicator variable denoting if instrument tip k is located at pixel coordinates m, n:

$$\forall\, b_{m,n} \in B_i,\ b_{m,n} = \begin{cases} 1 & \text{if } \sum_k s_{k,m,n} \geq 1 \\ 0 & \text{otherwise} \end{cases} \qquad \text{(Equation 1)}$$

For training, the overall loss function may combine binary cross-entropy for skill classification L B C E and the Dice coefficient between the spatial attention map $$A_i^{spatial}$$

and the tool-tip heat map B:

$$L_{Dice} = DL(\{A_i^{spatial} | i \in [1, N]\}, \{B_i | i \in [1, N]\}) \qquad \text{(Equation 2)}$$

$$L = L_{BCE} + \lambda \cdot L_{Dice} \qquad \text{(Equation 3)}$$

The weighting factor λ, may empirically be set to a number from about 0.1 to about 0.9 a(e.g., 0.5). The attention map $$A_i^{spatial}$$

may be supervised using the trajectory heat map (which is one example of a structured element relevant for surgical skill) so that the attended image feature vector has greater weight on features around the structured element (instrument tips).

Figure 12:
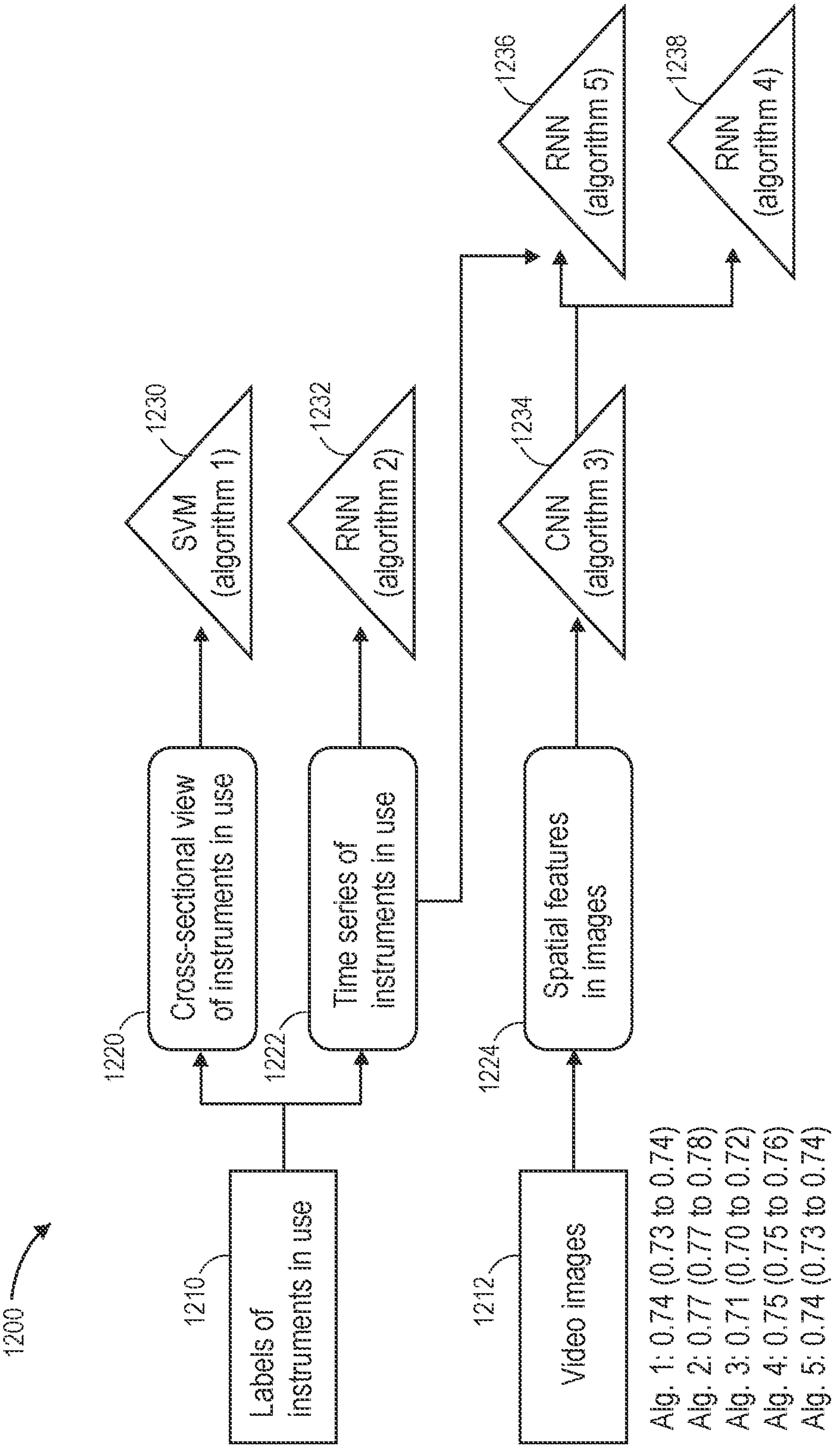
FIG. 12 illustrates a flowchart of a method for determining the surgical skill, according to an embodiment.

FIG. 12 illustrates a flowchart of a method 1200 for determining the surgical task or step, according to an embodiment. A first input 1210 may be or include the instrument 410 used to perform the surgical task. For example, the first input 1210 may be or include the type of instrument 410, the label(s) of the instrument 410, the locations of the portions 411-414 of the instrument 410, or a combination thereof. A second input 1212 may be or include the video of the surgical task.

One or more views (e.g., cross-sectional views) 1220 of the instrument 410 may be determined based at least partially upon the first input 1210. The view(s) 1220 may be determined manually and/or automatically. The view(s) 1220 may be introduced into a first ANN 1230, which may be running a supervised machine learning (SVM) algorithm. One or more time series 1222 of the instrument 410 may also or instead be determined based at least partially upon the first input 1210. The time series 1222 may be determined manually and/or automatically. The time series 1222 may be introduced into a second ANN 1232, which may be running a recurrent neural network (RNN) algorithm.

One or more spatial features 1224 in the frames of the video may be determined based at least partially upon the second input 1212. The spatial features 1224 may be determined manually or automatically. The spatial features 1224 may be introduced into a third ANN 1234, which may be running a convolution neural network (CNN) algorithm.

In one embodiment, the time series 1222 and/or the output from the third ANN 1234 may be introduced into a fourth ANN 1236, which may be running a RNN algorithm. The output from the third ANN 1234 may also or instead be introduced into a fifth ANN 1238, which may be running a RNN algorithm. One or more of the ANNs 1230, 1232, 1234, 1236, 1238 may categorize the metrics. Performance of the ANNs may be measured using the area under the receiver-operating characteristic curve (e.g., AUROC or AUC). AUROC may be interpreted as the probability that the algorithm correctly assigns a higher score to the expert video in a randomly drawn pair of expert and novice videos. The AUC for ANNs 1230, 1232, 1234, 1236, 1238 are shown at the bottom-left of FIG. 12. Thus, these numbers may represent measures of performance of the algorithms. They may be the same measure as the last column in Table 3.

Figure 13:
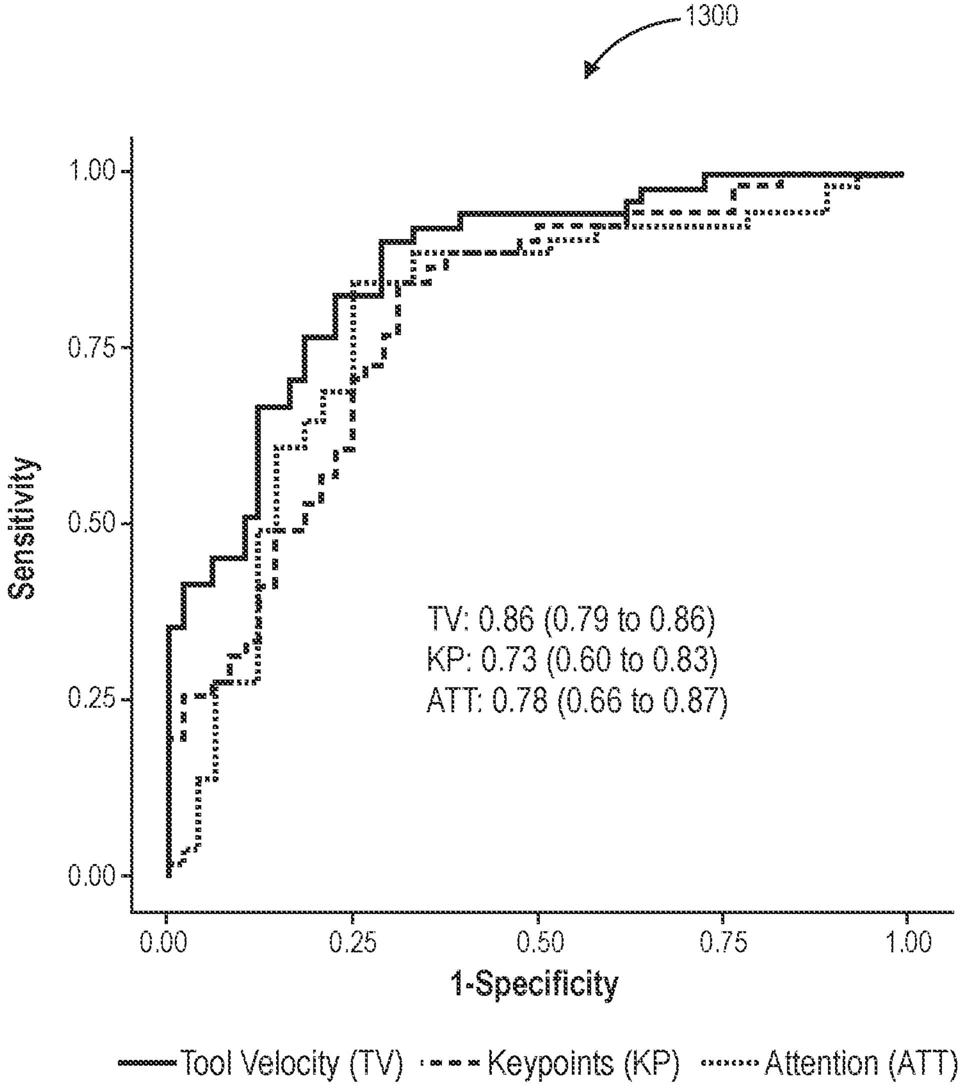
FIG. 13 illustrates a graph showing the determination of the surgical skill, according to an embodiment.

FIG. 13 illustrates a model (e.g., a graph) 1300 showing the determination of the surgical skill, according to an embodiment. As used in the graph 1300, "sensitivity" refers to the probability that the algorithm correctly determines an expert video as expert. As used in the graph 1300, "specificity" refers to the probability that the algorithm correctly determines a novice video as novice. The AUC, which may be computed as the area under the curve for an algorithm on this graph 1300, are shown under the three curves.

The graph 1300 may be generated as part of step 114 to provide a visual representation of performance of the algorithm used to determine surgical skill. The ANNs may receive different input data, including (e.g., manually) annotated instrument tips 411, 412 (represented as tool velocity; TV in FIG. 13); predicted locations of the instrument tips 411, 412 (KP in FIG. 13), and short clips of input video (ATT in FIG. 13). One or more (e.g., two) of the ANNs may be or include a temporal convolutional network (e.g., TV and KP). One or more (e.g., one) of the ANNs may rely upon attention mechanisms that shed light on which segments and/or metrics of the video may influence the determined and/or predicted surgical skill (e.g., explaining the prediction in terms of segments and/or metrics of the video).

Table 3 below illustrates results from an illustrative algorithm (e.g., a random forest algorithm) determining the surgical skill based upon the one or more metrics. As used in the table, "positive predictive value" refers to the probability that a video determined to be by an expert is actually by an expert. As used in the table, "negative predictive value" refers to the probability that a video determined to be by a novice is actually by a novice. As used in the table, "quadrant-specific" refers to metrics computed using data from one quadrant or segment of capsulorhexis as illustrated in FIG. 3. As used in the table, "quadrant 3" refers to the supraincisional quadrant 333 illustrated in FIG. 3. As used in the table, "grasp/tear" refers to metrics listed in the grasp/tear category in Table 2. As used in the table, "grasp/tear 3" refers to metrics listed in the grasp/tear category in Table 2 for the supraincisional quadrant_333 illustrated in FIG. 3. As used in the table, "position/distance" refers to metrics listed in the position/distance category in Table 2. As used in the table, "position/distance 3" refers to metrics listed in the position/distance 1-4 category in Table 2 for the supraincisional quadrant_333 illustrated in FIG. 3.

TABLE 3

Measures of performance of one illustrative algorithm to determine surgical skill based upon metrics

| Subset Name | # of Metrics | Sensitivity | Specificity | Positive Predictive Value | Negative Predictive Value | AUC |
|---|---|---|---|---|---|---|
| All | 55 | 0.69 (0.56 to 0.82) | 0.64 (0.50 to 0.79) | 0.69 (0.56 to 0.82) | 0.64 (0.50 to 0.79) | 0.75 (0.65 to 0.85) |
| General | 17 | 0.65 | 0.74 | 0.74 | 0.65 | 0.74 |
| Quadrant-Specific | 40 | 0.69 | 0.60 | 0.66 | 0.63 | 0.71 |
| Quadrant 3 | 12 | 0.75 | 0.64 | 0.71 | 0.69 | 0.78 |
| Grasp/Tear | 25 | 0.67 | 0.60 | 0.65 | 0.61 | 0.68 |
| Grasp/Tear 3 | 5 | 0.63 | 0.64 | 0.67 | 0.60 | 0.67 |
| Position/Distance | 40 | 0.69 | 0.57 | 0.65 | 0.62 | 0.76 |
| Position/Distance 3 | 10 | 0.69 | 0.67 | 0.70 | 0.65 | 0.76 |

The method 100 may also include providing feedback about the surgical skill, as at 116. The feedback may be determined and provided based at least partially upon the unmarked video (from 104), the segments of the task (from 106), the marked portions 411-414 (from 108), the metrics (from 110), the categories (from 112), the determined skill (from 114), or a combination thereof. The feedback may be targeted to a specific part of the surgical task (e.g., a particular segment). In one embodiment, the feedback may be provided in real-time (e.g., during the surgical task).

The feedback may be determined and provided automatically. More particularly, the ANN may determine and provide the feedback. The ANN may be trained using the library of videos of similar surgical tasks where the metrics and surgical skill have been previously determined. The feedback may be in the form of audio feedback, video feedback, written/text feedback, or a combination thereof.

The method 100 may also include predicting the surgical skill (e.g., of the surgeon) during a future task, as at 118. The surgical skill may be predicted based at least partially upon the unmarked video (from 104), the segments of the task (from 106), the marked portions 411-414 (from 108), the metrics (from 110), the categories (from 112), the determined skill (from 114), the feedback (from 116), or a combination thereof. The future task may be the same type of surgical task (e.g., a capsulorhexis procedure) or a different type of surgical task (e.g., a prostatectomy procedure).

Thus, the systems and methods described herein may use videos of the surgical task as input to a software solution to provide surgeons with information to support their learning. The solution includes a front end to interface with surgeons, whereby they upload videos of surgical tasks 200 they perform, and receive/view objective assessments of surgical skill and specific feedback on how they can improve. On the back end, the software includes multiple algorithms that provide the functionalities in the platform. For example, when a surgeon uploads a video of a cataract surgery procedure, one implementation of an ANN extracts video for the capsulorhexis step, and additional implementations of ANNs predict a skill rating for capsulorhexis and specific feedback on how the surgeon can improve his/her performance. An additional element may include providing surgeons with narrative feedback. This feedback can effectively support surgeon's learning and improvement in skill.

Figure 14:
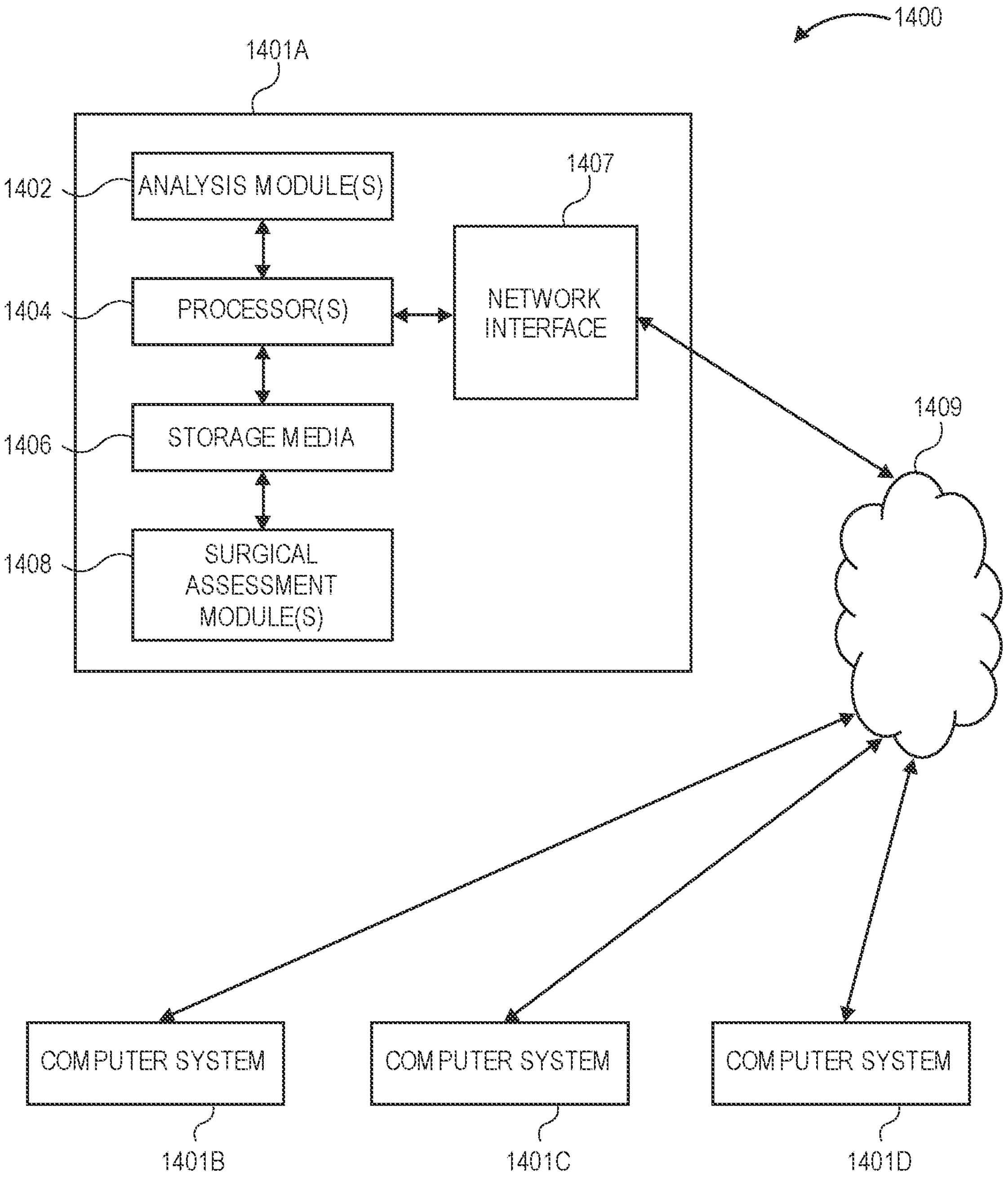
FIG. 14 illustrates a schematic view of an example of a computing system for performing at least a portion of the method(s) disclosed herein, according to an embodiment.

FIG. 14 illustrates a schematic view of an example of a computing system 1400 for performing at least a portion of the method 100, according to an embodiment. The computing system 1400 may include a computer or computer system 1401A, which may be an individual computer system 1401A or an arrangement of distributed computer systems. The computer system 1401A includes one or more analysis modules 1402 that are configured to perform various tasks according to some embodiments, such as one or more methods disclosed herein. To perform these various tasks, the analysis module 1402 executes independently, or in coordination with, one or more processors 1404, which is (or are) connected to one or more storage media 1406A. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor can include a microprocessor, microcontroller, processor module or subsystem, programmable integrated circuit, programmable gate array, or another control or computing device.

The storage media 1406A can be implemented as one or more computer-readable or machine-readable storage media. Note that while in the example embodiment of FIG. 14 storage media 1406A is depicted as within computer system 1401A, in some embodiments, storage media 1406A may be distributed within and/or across multiple internal and/or external enclosures of computing system 1401A and/or additional computing systems. Storage media 1406A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1400 contains one or more fine scale surgical assessment module(s) 1408 which may be used to perform at least a portion of the method 100. It should be appreciated that computing system 1400 is only one example of a computing system, and that computing system 1400 may have more or fewer components than shown, may combine additional components not depicted in the example embodiment of FIG. 14, and/or computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method, comprising:

determining one or more metrics of a surgical task being performed by a surgeon based at least partially upon a type of the surgical task being performed and videos of the surgical task being performed, wherein the videos comprise:

a first video captured by a first camera that is outside of a patient; and a second video captured by a second camera that is inside of the patient;

marking one or more portions in the videos, wherein marking the one or more portions comprises predicting locations of the one or more portions using a supervised machine learning (SVM) algorithm when the one or more portions are not visible in the videos, wherein the one or more marked portions represent a tip of an instrument; and determining a surgical skill of the surgeon during the surgical task based at least partially upon the one or more marked portions, wherein the surgical skill is determined by explicitly supervising an attention map using a trajectory of the tip of the instrument.

2. The method of claim 1, further comprising:

segmenting the surgical task into a plurality of segments; and categorizing the one or more metrics into a plurality of categories based at least partially upon the segments, wherein the surgical skill is determined based at least partially upon one or more of the segments, one or more of the categories, or both.

3. The method of claim 1, wherein the one or more metrics are determined based at least partially upon the one or more marked portions.

4. The method of claim 3, wherein the one or more portions comprise the tip of the instrument and an insertion site where the instrument is situated or manipulated relative to the anatomy.

5. The method of claim 3, wherein the instrument comprises forceps, wherein the one or more portions comprise first and second tips of the forceps, and wherein determining the one or more metrics comprises:

determining that the forceps are in a closed state based at least partially upon a distance between the first and second tips;

determining that the first and second tips are grasping the anatomy based at least partially upon the forceps being in the closed state in a predetermined number of consecutive frames of the videos; and determining that the forceps are tearing the anatomy based at least partially upon the forceps moving more than a predetermined distance while the first and second tips are grasping the anatomy.

6. The method of claim 1, wherein the surgical skill is determined using a temporal convolution network, and wherein the temporal convolution network is trained using a plurality of previously analyzed videos in which the surgical skill has been determined in the previously analyzed videos.

7. The method of claim 1, wherein determining the surgical skill comprises:

transforming the videos into one or more features using a convolutional neural network (CNN) that is augmented using a spatial attention module; and analyzing the one or more features using a recurrent neural network (RNN) that is augmented using a temporal attention module, or both.

8. The method of claim 7, wherein determining the surgical skill also comprises:

constructing an attention map based at least partially upon the videos; and explicitly supervising learning of the attention map.

9. The method of claim 1, further comprising providing feedback about the surgical skill during the surgical task.

10. The method of claim 1, further comprising predicting the surgical skill during a future surgical task based at least partially upon the videos, the one or more metrics, the determined surgical skill, or a combination thereof.

11. A method for determining a surgical skill of a surgeon during a surgical task, the method comprising:

capturing videos of a surgical task being performed by a surgeon, wherein the videos comprise:

a first video captured by a first camera that is outside of a patient; and a second video captured by a second camera that is inside of the patient;

segmenting the surgical task into a plurality of segments;

marking one or more portions in the videos, wherein the one or more marked portions comprise an instrument that the surgeon is using to perform the surgical task;

determining one or more metrics of the surgical task based at least partially upon a type of the surgical task being performed, one or more of the segments, and the one or more marked portions, wherein the one or more metrics describe movement of the instrument, an appearance of the anatomy, a change in the anatomy, an interaction between the instrument and the anatomy, or a combination thereof, wherein the instrument comprises forceps, wherein the one or more portions comprise first and second tips of the forceps, and wherein determining the one or more metrics comprises:

determining that the forceps are in a closed state based at least partially upon a distance between the first and second tips;

determining that the first and second tips are grasping the anatomy based at least partially upon the forceps being in the closed state in a predetermined number of consecutive frames of the videos; and determining that the forceps are tearing the anatomy based at least partially upon the forceps moving more than a predetermined distance while the first and second tips are grasping the anatomy;

determining a surgical skill of the surgeon during the surgical task based at least partially upon the one or more metrics, wherein the surgical skill is determined by explicitly supervising an attention map using a trajectory of the first and second tips of the forceps; and providing feedback about the surgical skill.

12. The method of claim 11, wherein determining the surgical skill also comprises constructing the attention map, and wherein constructing the attention map comprises:

constructing a different binary trajectory heat map for a plurality of frames in the videos; and combining locations of a tip of the instrument in each of the binary trajectory heat maps.

13. The method of claim 11, wherein the one or more metrics comprise:

the instrument grasping the anatomy; and the instrument cutting or tearing the anatomy to form the segments, wherein the segments comprise a subincisional quadrant, a postincisional quadrant, a supraincisional quadrant, and a preincisional quadrant.

14. The method of claim 11, wherein determining the one or more metrics comprises determining that the forceps are in the closed state based at least partially upon a distance between the first and second tips being less than a mode plus one standard deviation of the distance between the first and second tips.

15. A computing system for determining a surgical skill of a surgeon during a surgical task, the computing system comprising:

one or more processors; and a memory system comprising one or more non-transitory computer-readable media storing instructions that, when executed by at least one of the one or more processors, cause the computing system to perform operations, the operations comprising:

receiving videos of a surgical task being performed by a surgeon, wherein the videos comprise:

a first video captured by a first camera that is outside of a patient; and a second video captured by a second camera that is inside of the patient;

segmenting the surgical task into a plurality of segments;

marking one or more portions in the videos, wherein the one or more marked portions comprise an instrument that the surgeon is using to perform the surgical task;

determining one or more metrics of the surgical task based at least partially upon a type of the surgical task being performed, one or more of the segments, and the one or more marked portions, wherein the one or more metrics describe movement of the instrument, an appearance of the anatomy, a change in the anatomy, an interaction between the instrument and the anatomy, or a combination thereof, determining a surgical skill of the surgeon during the surgical task based at least partially upon the one or more metrics, wherein determining the surgical skill also comprises:

constructing an attention map based at least partially upon the videos; and explicitly supervising learning of the attention map using a trajectory of the instrument; and providing feedback about the surgical skill.

16. The computing system of claim 15, wherein the videos are captured simultaneously from different viewpoints.

17. The computing system of claim 15, wherein determining the surgical skill comprises generating a score.

18. The computing system of claim 15, wherein the operations further comprise generating a model to display the surgical skill.

* * * * *